(12) United States Patent
Kalakrishnan et al.

(10) Patent No.: US 9,393,693 B1
(45) Date of Patent: Jul. 19, 2016

(54) METHODS AND SYSTEMS FOR DETERMINING AND MODELING ADMISSIBLE GRIPPER FORCES FOR ROBOTIC DEVICES

(71) Applicant: Google Inc., Mountain View, CA (US)

(72) Inventors: Mrinal Kalakrishnan, Palo Alto, CA (US); Ethan Rublee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 14/467,348

(22) Filed: Aug. 25, 2014

Related U.S. Application Data

(60) Provisional application No. 62/022,871, filed on Jul. 10, 2014.

(51) Int. Cl.
*B25J 9/16* (2006.01)

(52) U.S. Cl.
CPC .............. *B25J 9/1671* (2013.01); *B25J 9/1602* (2013.01); *Y10S 901/02* (2013.01)

(58) Field of Classification Search
CPC ...... B25J 9/1671; B25J 9/1602; B25J 9/1612; B25J 9/1628; B25J 9/163; B25J 9/1656; B25J 9/1664; G05B 2219/39536; G05B 2219/39542; G05B 2219/39543; G05B 2219/39547; G05B 2219/39523; G05B 2219/39514; G05B 2219/39478; Y10S 901/02
See application file for complete search history.

(56) References Cited

U.S. PATENT DOCUMENTS

| | | |
|---|---|---|
| 8,554,370 B2 | 10/2013 | Goswami et al. |
| 2009/0118864 A1 | 5/2009 | Eldridge et al. |
| 2013/0131868 A1 | 5/2013 | Rucker et al. |
| 2014/0163731 A1 | 6/2014 | Shi et al. |

FOREIGN PATENT DOCUMENTS

WO    WO2006117022    11/2006

*Primary Examiner* — James Trammell
*Assistant Examiner* — Adam Mott
(74) *Attorney, Agent, or Firm* — McDonnell Boehnen Hulbert & Berghoff LLP

(57) ABSTRACT

Methods and systems for determining and modeling admissible gripper forces are described. An example method may involve receiving data representative of a plurality of trajectories along which a robotic manipulator, while gripping one or more physical objects, previously moved the one or more objects without dropping the one or more objects. The method may also involve determining set of force vectors corresponding to the trajectories. The method may also involve determining a three-dimensional virtual model of the set, where boundaries of the model represent constraints on magnitudes of forces that are applied in a given direction to perform the trajectories. The method may then involve determining one or more subsequent trajectories that correspond to a subsequent set of force vectors that are within the boundaries of the model and along which the robotic manipulator can move a subsequent physical object at particular accelerations without dropping the subsequent object.

20 Claims, 12 Drawing Sheets

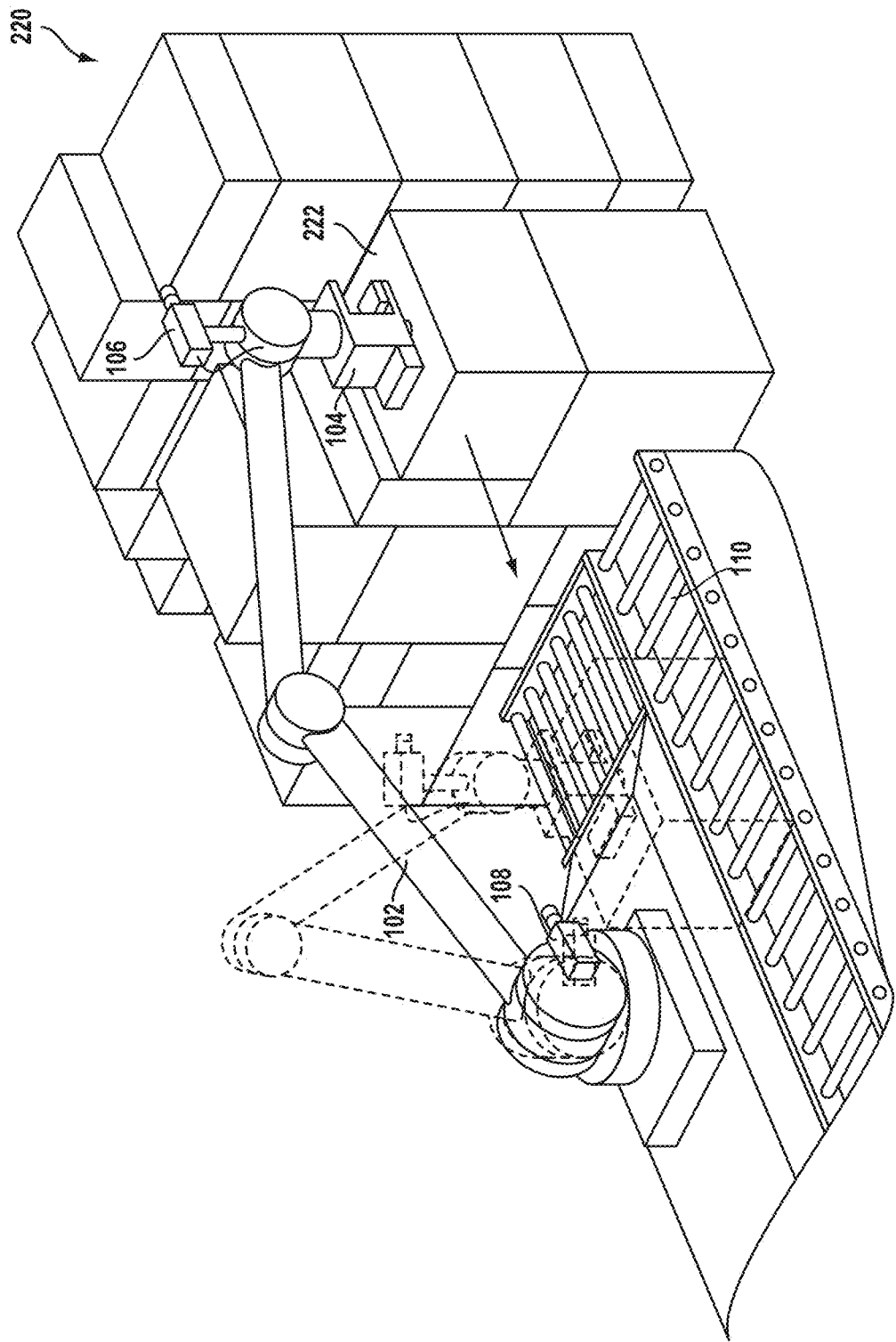

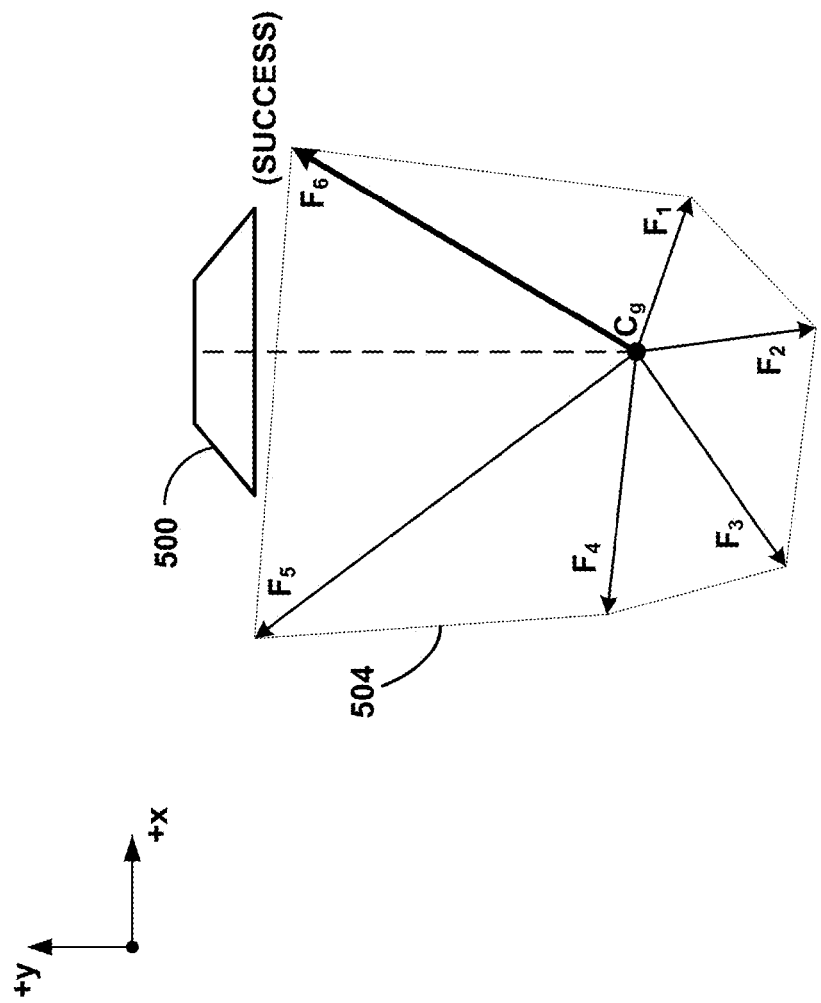
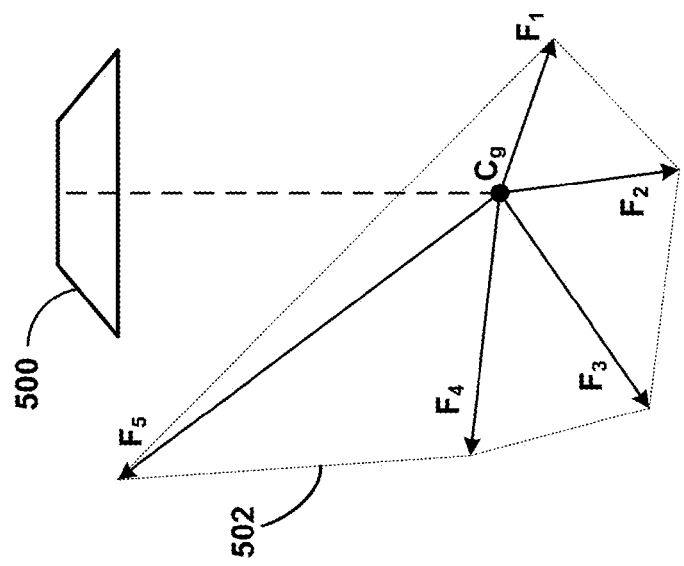
FIG. 5B
FIG. 5A

METHODS AND SYSTEMS FOR DETERMINING AND MODELING ADMISSIBLE GRIPPER FORCES FOR ROBOTIC DEVICES

CROSS-REFERENCE TO RELATED APPLICATION

The present disclosure claims priority to U.S. Provisional Application No. 62/022,871, filed on Jul. 10, 2014, the entire contents of which are herein incorporated by reference.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a given area. In some cases, all of the objects may be of the same type. In other cases, a container or truck may contain a mix of different types of objects, such as boxed items, cans, tires, or other objects of varying weights and sizes. Such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

The present application discloses implementations that relate to determining and modeling admissible forces for grippers of robotic devices. In one aspect, the present application describes a method. The method may involve receiving, by one or more processors, data representative of a plurality of trajectories along which a robotic manipulator, while gripping one or more physical objects using a gripper, previously moved the one or more physical objects without dropping the one or more physical objects. The method may also involve determining, by the one or more processors, a set of force vectors corresponding to the plurality of trajectories. The method may further involve determining, by the one or more processors, a virtual model of the set of force vectors, where boundaries of the virtual model are representative of constraints on magnitudes of forces that are applied in a given direction to perform the plurality of trajectories. The method may still further involve determining, by the one or more processors, one or more subsequent trajectories corresponding to a subsequent set of force vectors that are within the boundaries of the virtual model, where the determined one or more subsequent trajectories represent trajectories that enable the robotic manipulator to move a subsequent physical object at particular accelerations along the subsequent trajectories without dropping the subsequent physical object.

In another aspect, the present application describes a non-transitory computer readable medium having stored thereon instructions that, upon execution by a computing device, cause the computing device to perform operations. The operations may include receiving data representative of a plurality of trajectories along which a robotic manipulator, while gripping one or more physical objects using a gripper, previously moved the one or more physical objects without dropping the one or more physical objects. The operations may also include determining a set of force vectors corresponding to the plurality of trajectories. The operations may further include determining a virtual model of the set of force vectors, where boundaries of the virtual model are representative of constraints on magnitudes of forces that are applied in a given direction to perform the plurality of trajectories. The operations may still further include determining one or more subsequent trajectories corresponding to a subsequent set of force vectors that are within the boundaries of the virtual model, where the determined one or more subsequent trajectories represent trajectories that enable the robotic manipulator to move a subsequent physical object at particular accelerations along the subsequent trajectories without dropping the subsequent physical object.

In still another aspect, the present application describes a system. The system may include a robotic manipulator, a gripper coupled to the robotic manipulator, at least one processor, and data storage comprising instructions executable by the at least one processor to cause the system to perform operations. The operations may include receiving data representative of a plurality of trajectories along which the robotic manipulator, while gripping one or more physical objects using the gripper, previously moved the one or more physical objects without dropping the one or more physical objects. The operations may also include determining a set of force vectors corresponding to the plurality of trajectories. The operations may further include determining a virtual model of the set of force vectors, where boundaries of the virtual model are representative of constraints on magnitudes of forces that are applied in a given direction to perform the plurality of trajectories. The operations may still further include determining one or more subsequent trajectories corresponding to a subsequent set of force vectors that are within the boundaries of the virtual model, where the determined one or more subsequent trajectories represent trajectories that enable the robotic manipulator to move a subsequent physical object at particular accelerations along the subsequent trajectories without dropping the subsequent physical object.

In yet another aspect, a system is provided that includes a means for receiving data representative of a plurality of trajectories along which a robotic manipulator, while gripping one or more physical objects using a gripper, previously moved the one or more physical objects without dropping the one or more physical objects. The system may also include a means for determining a set of force vectors corresponding to the plurality of trajectories. The system may further include a means for determining a virtual model of the set of force vectors, where boundaries of the virtual model are representative of constraints on magnitudes of forces that are applied in a given direction to perform the plurality of trajectories. The system may still further include a means for determining one or more subsequent trajectories corresponding to a subsequent set of force vectors that are within the boundaries of the virtual model, where the determined one or more subsequent trajectories represent trajectories that enable the robotic manipulator to move a subsequent physical object at particular accelerations along the subsequent trajectories without dropping the subsequent physical object.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 2C shows the robotic arm from FIG. 2A moving a box, according to an example implementation.

FIGS. 5A-5C illustrate example operations of the example method being performed, in accordance with at least some implementations described herein.

DETAILED DESCRIPTION

Figure 1A:
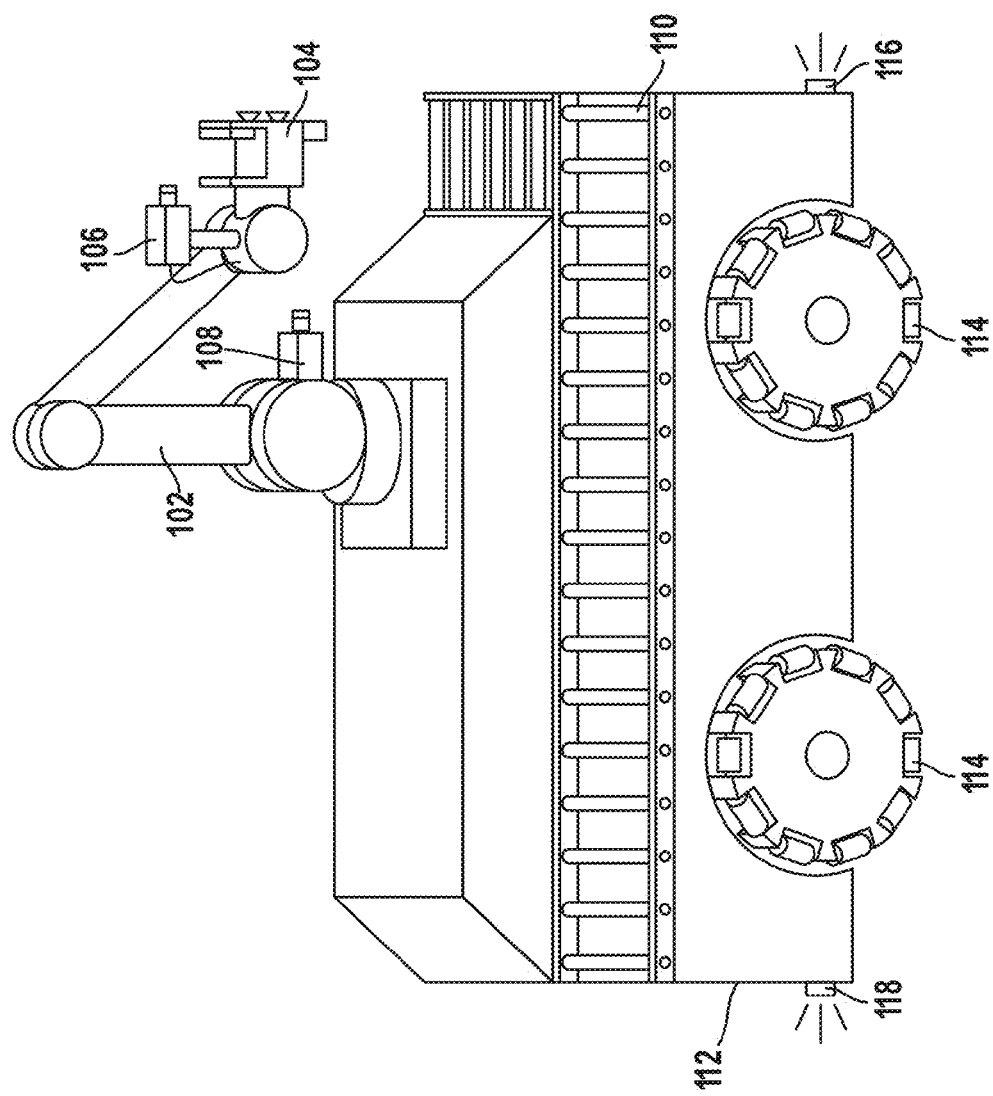
FIG. 1A shows a robotic arm mounted on a moveable base, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the term "robotic manipulator" may be used to describe one or more robotic devices, such as a robotic arm, configured to grab, move, or otherwise manipulate and interact with physical objects, such as boxes. Further, the terms "physical object" may be used interchangeably with the term "payload," and either may refer to objects that a robotic manipulator may manipulate and interact with. Still further, the term "gripper" may be used to describe a single gripper configured to couple to or otherwise contact an object in order to facilitate movement of the object, whereas the term may also be used to describe an apparatus that may include multiple grippers configured to couple to or otherwise contact an object in order to facilitate movement of the object.

Robotic grippers, such as grippers comprising suction cups or other means for gripping, are limited in the amount of forces and torques they can withstand due to the weight of the payload and acceleration of the payload. However, the limits of force that a particular gripper can experience can be difficult to precisely predict from the design of that particular gripper, and even that prediction may not reflect the true limits of that gripper in reality.

Accordingly, to facilitate more precise calculations of what forces can be experienced by a gripper, provided herein are methods and systems for experimentally determining and modeling limits of a gripper, and subsequently using such a model to generate trajectories that can safely transport a payload without dropping it. For example, data can be collected that corresponds to forces and torques experienced at the gripper interface during successful execution of trajectories which did not cause the payload to fall. These admissible forces can then be modeled, such as by wrapping a surface (e.g., a convex hull or other type of surface) around the collected data. Such a model can then be used to generate trajectories that respect the constraints which the model represents and ensure that the payload is not dropped during transportation. For a given gripper, and using various boxes with various weights, centers of mass, etc., a function can be built from force vectors and will indicate whether a new force vector will cause a box or other object held by the gripper to break off the gripper.

An example system may include a robotic manipulator (e.g., a robotic arm), a gripper coupled to the robotic manipulator, and a control system configured to perform various operations. These operations may include receiving data representative of a plurality of trajectories along which the robotic manipulator, while gripping a physical object using the gripper, previously moved one or more physical objects without dropping the one or more physical objects. This data can include respective accelerations corresponding to the plurality of trajectories. The operations may further include determining a set of force vectors corresponding to the plurality of trajectories. Given the known mass of the physical object, force vectors may be computed by the robotic manipulator accelerating the one or more physicals object through certain accelerations. In some implementations, only the force vectors that are associated with the gripper not having dropped the one or more physical objects may be determined.

Next, the operations may include determining a virtual model, such as an n-dimensional virtual model, of the set of force vectors. For instance, once the set of force vectors is determined, an isosurface or other model may be determined using determined sets of planes associated with each force vector. Then subsequent force vectors can be compared with the virtual model to see if those force vectors fall outside the boundaries (i.e., the set of planes) of the virtual model. These boundaries may be representative of constraints on magnitudes of forces that can be applied to the one or more physical objects (and/or to similar physical objects). For instance, if a magnitude of a given force vector falls outside of the boundaries, that given force vector may not be used as part of a subsequent trajectory, or may otherwise be rejected or discounted (e.g., such as during "training" of the system and determining the initial virtual model).

The operations may then further include determining one or more subsequent trajectories corresponding to a subsequent set of force vectors that fall within boundaries of the virtual model. These determined one or more subsequent trajectories represent trajectories along which the robotic manipulator can move a subsequent physical object without dropping the subsequent physical object.

Various additional examples are described below, therefore the above examples are not meant to be limiting. For illustration, portions of the methods and apparatuses will be described with respect to determining and modeling admissible gripper forces, along with implementations of determined admissible gripper forces. It should be understood, however, that part or all of the methods and apparatus may apply equally to other techniques for determining, modeling, and using admissible gripper forces.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

While some robotic devices may be fixed at a location in an environment, in some implementations, a robotic device can be made mobile by coupling the robotic device with a wheeled base, a holonomic base (e.g., a base that can move in any direction), or rails on the ceiling, walls or floors. According to various implementations, a robotic manipulator may be mounted on a holonomic base (e.g., a base with wheels that allow the base to move in any direction). FIG. 1A depicts an exemplary holonomic base containing a robotic manipulator. In some implementations, a moveable base 112 may include a robotic arm 102 mounted on the base 112. The robotic arm 102 may contain a gripping component 104 for gripping objects within the environment. The base may contain one or more wheels 114, which may be holonomic wheels that operate with two degrees of freedom. In further implementations, a wraparound front conveyor belt 110 may be included on the holonomic base 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example implementations, one or more robotic manipulators may be mounted on rails of a truck or container. In such examples, the robotic manipulators may be used to load or unload the truck or container.

Figure 1B:
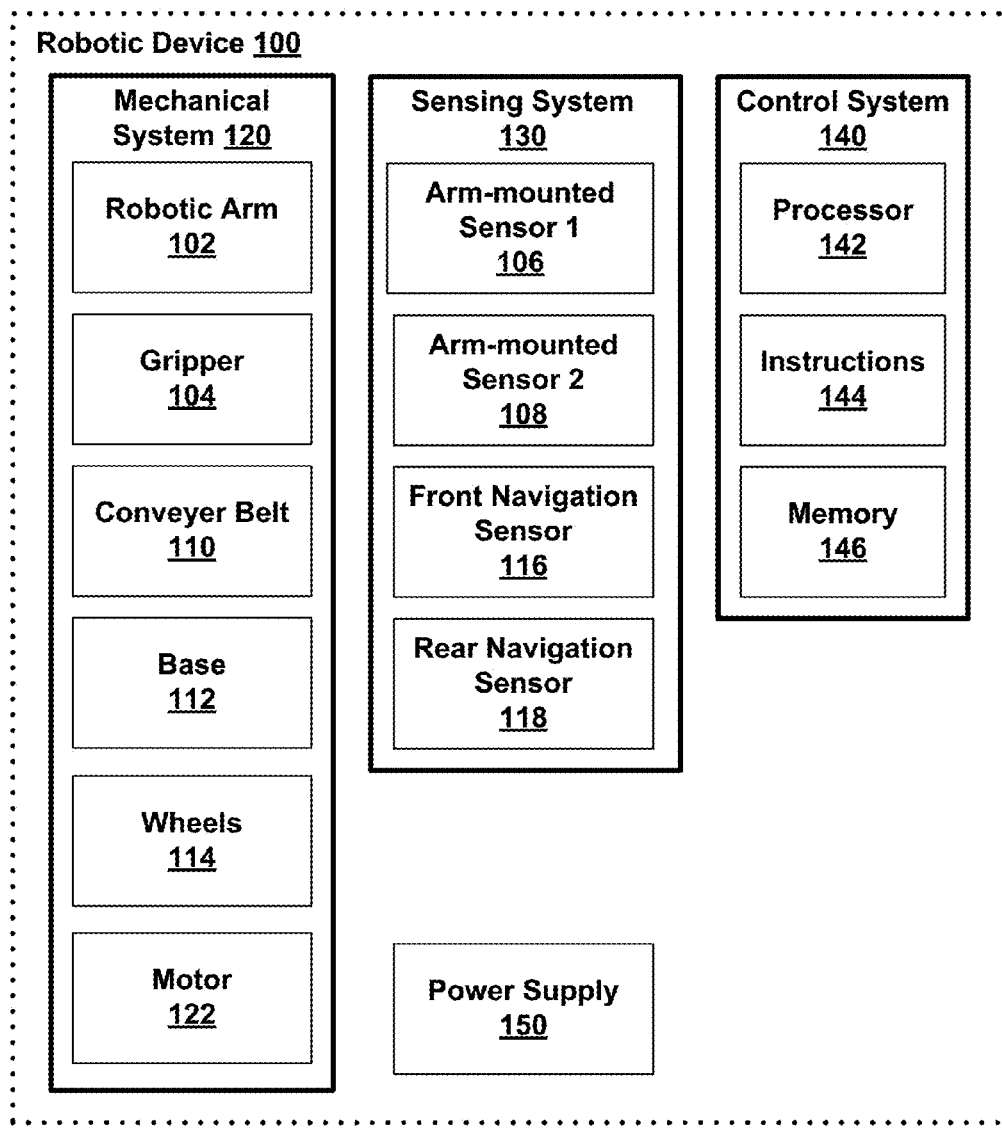
FIG. 1B is a functional block diagram illustrating a robotic device, according to an example implementation.

FIG. 1B is a functional block diagram illustrating a robotic device 100, according to an example implementation. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) base 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example implementation, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system 130 may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading objects, for instance.

Within examples, the robotic arm 102 may be equipped with a gripper 104, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures. Other types of grippers are possible as well.

In some implementations, the gripper could potentially span several boxes or objects and turn on suction for some or all of the covered objects. In some implementations, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some implementations, the suction devices can sense after a certain amount time whether they can successfully grip a surface, after which they may automatically shut off. In further implementations, sections of the suction devices can fold down to grasp the top of the boxes. For instance, grippers can initially start at full extension and then conform to the surface being gripped.

In further examples, the robotic arm can implement a wiggle movement to improve a suction grip. In additional implementations, the robotic arm can wiggle a box side-to-side to help segment the box from its surroundings. In other implementations, the arm can wiggle upon pick up of the box to avoid jostling other objects. In such implementations, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air. According to various implementations, physical objects can have concave, convex or otherwise rumpled faces that make it hard for a suction device to adhere to. Thus, wiggling the suction device as the device makes suction contact may enable a more reliable grip on physical objects, both planar and non-planar objects.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various implementations, cues such as barcodes, texture coherence, color, 3D surface properties, or printed text on the surface may also be used to identify an object and/or find its pose in order to know where and/or how to place the object (e.g., moving the object slowly due to the object being fragile). In some implementations, shadow or texture differences may be employed to segment objects as well.

Many or all of the operations of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some implementations, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
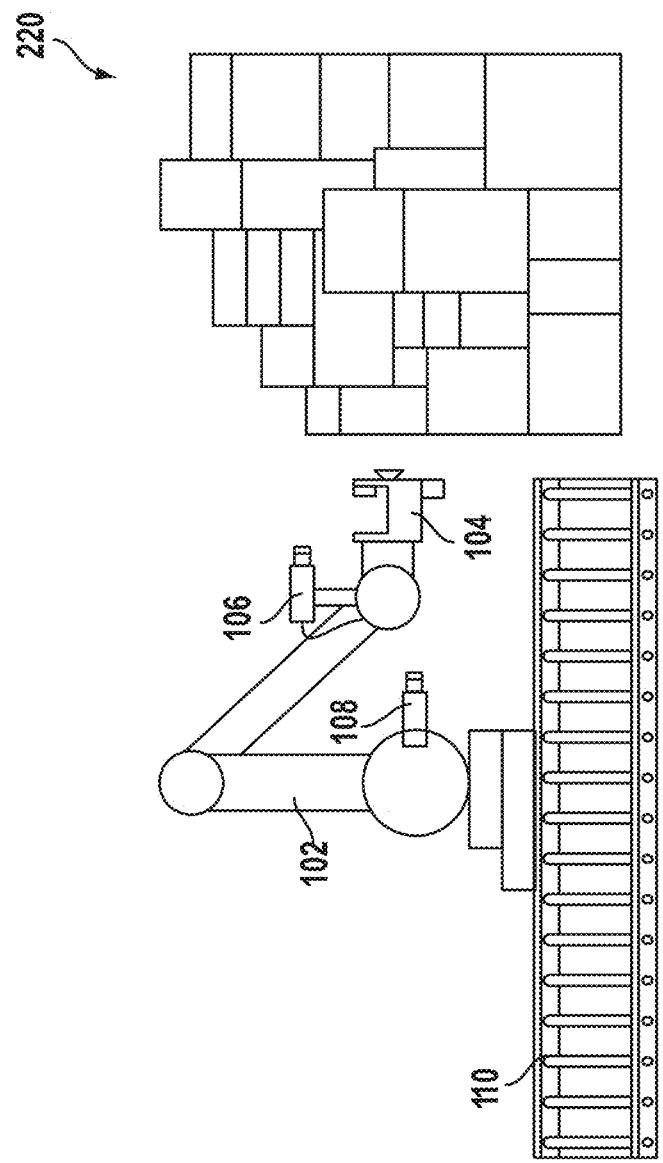
FIG. 2A shows a robotic arm and a stack of boxes, according to an example implementation.

According to various implementations, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example implementation. As shown, the robotic device may include a robotic arm 102 with a gripping component 104, sensors 106 and 108, and conveyer 110 as described above. In some examples, the robotic device could be mounted on a holonomic base as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
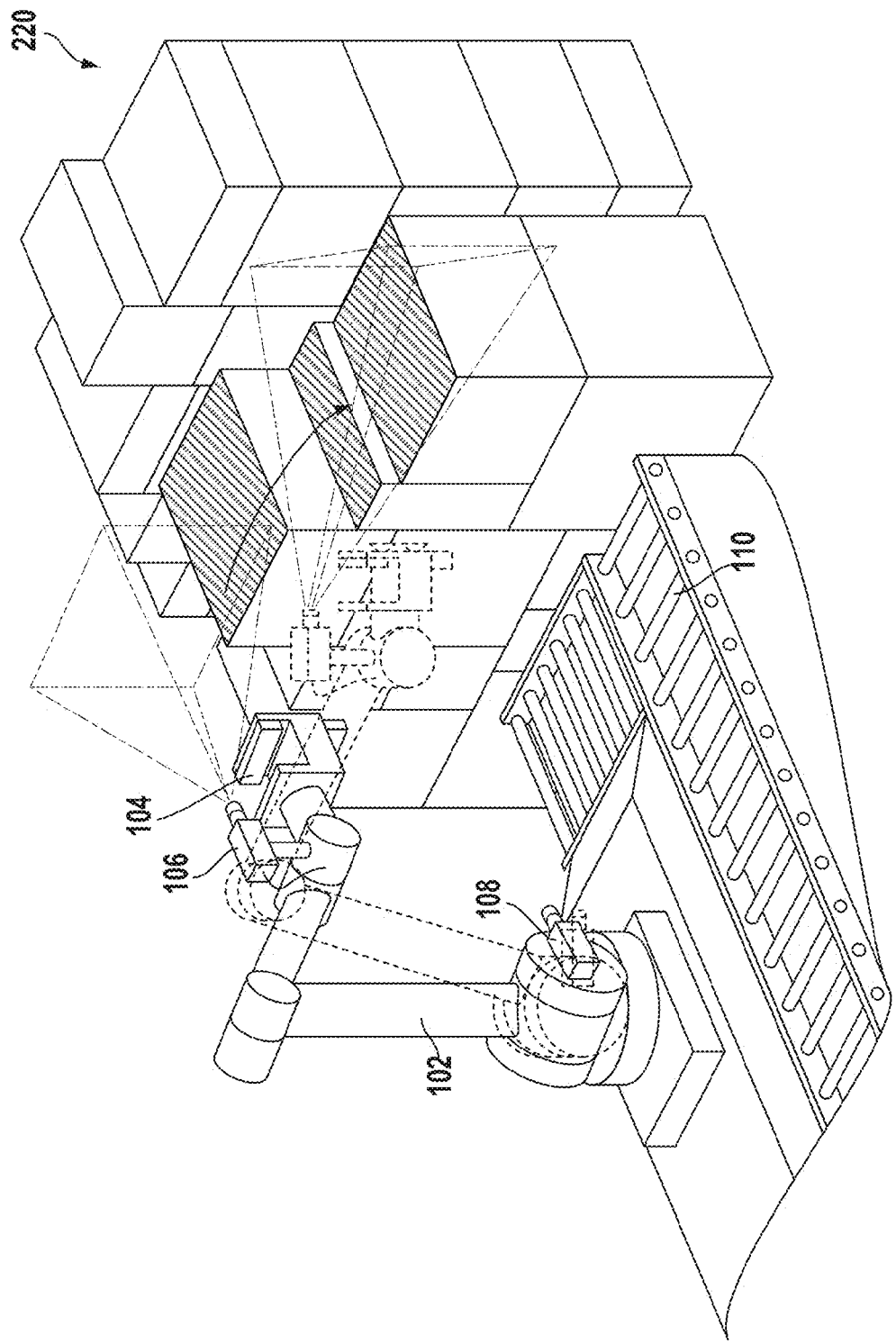
FIG. 2B shows scanning of the stack of boxes from FIG. 2A by a sensor mounted on the robotic arm, according to an example implementation.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various implementations, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal object may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyor belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some implementations, path constraints, such as collision avoidance for robotic arms, cameras, cables, and/or other components, may be put in a constraint based planning solver and solved for to yield a best path to move the arm for perception. Additionally, in some implementations, the solver may determine a best path for picking up, moving, and placing an object.

Figure 3:
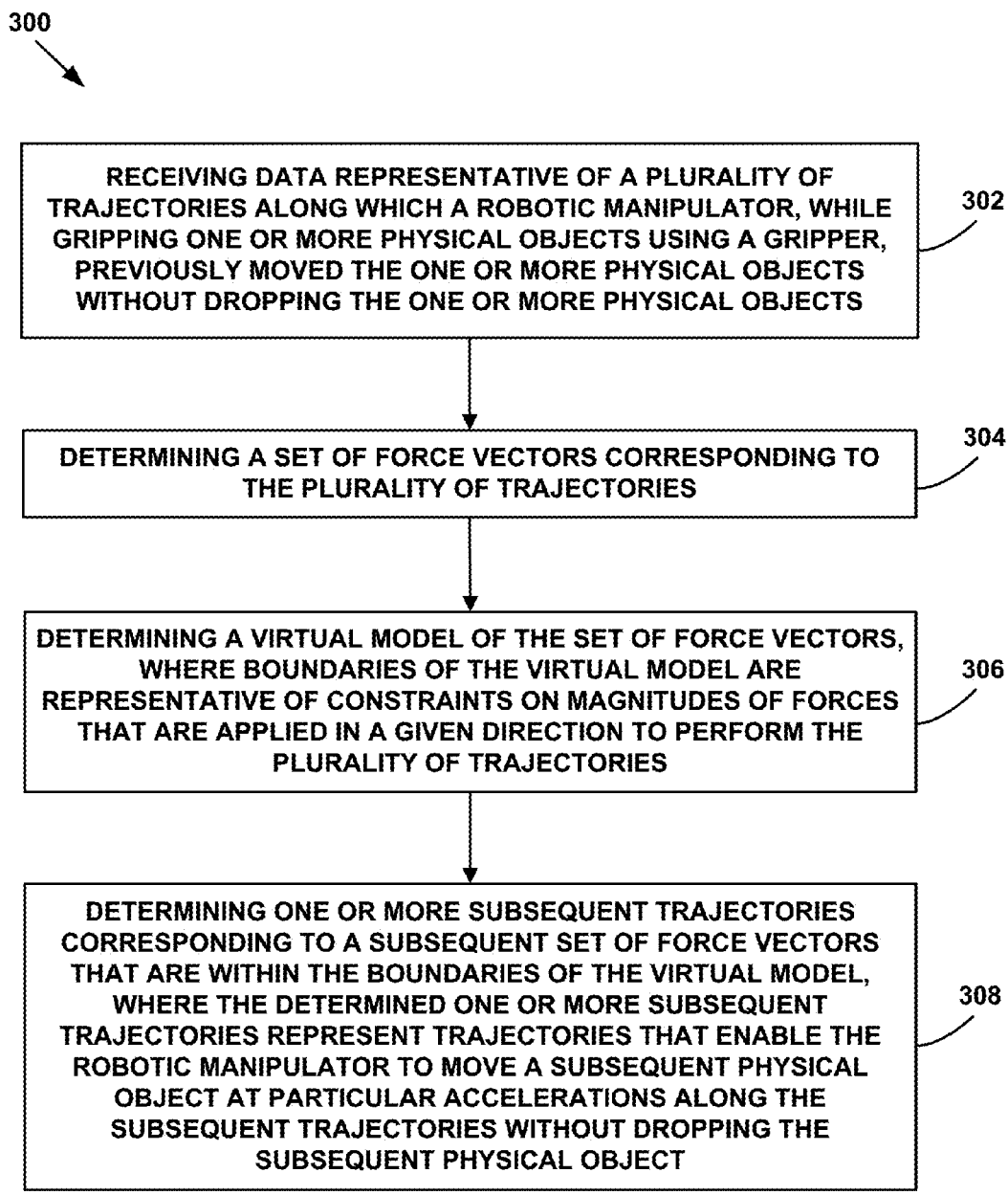
FIG. 3 is a flow chart of an example method, in accordance with at least some implementations described herein.

FIG. 3 is a flow chart of an example method for determining and modeling admissible gripper forces for robotic devices, in accordance with at least some implementations described herein. Method 300 shown in FIG. 3 presents an implementation of a method that, for example, could be used with the systems shown in FIGS. 1A-2C, for example, or may be performed by a combination of any components of in FIGS. 1A-2C. In addition, such an implementation of a method could be carried out in accordance with the systems and aspects illustrated in FIGS. 4, 5A, 5B, 5C, 6A, 6B, and 7. Method 300 may include one or more operations or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows operation of one possible implementation of present implementations. In this regard, each block may represent a module, a segment, or a portion of program code, which includes one or more instructions executable by a processor for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical operations in the process.

Operations of the method 300 may be fully performed by a computing device (e.g., by at least one processor thereof), or may be distributed across multiple computing devices and/or a server. In some examples, the computing device may receive information from sensors or other components coupled to the computing device, or where the computing device is a server the information can be received from another device that collects the information. The computing device could further communicate with a server to determine dimensions of physical objects, for example, where the server may include a database of accumulated determined box dimensions, box masses, box centers of mass, and/or other information that may facilitate the performance of the method 300.

At block 302, the method 300 includes receiving data representative of a plurality of trajectories along which a robotic manipulator, while gripping one or more physical objects using a gripper, previously moved the one or more physical objects without dropping the one or more physical objects.

At block 304, the method 300 includes determining a set of force vectors corresponding to the plurality of trajectories. In some scenarios, the received data may include at least partially determined sets of force vectors associated with respective trajectories. The received data may also include respective accelerations corresponding to the plurality of trajectories. Vectors in general may include a magnitude component and a direction component, and force vectors may thus include a magnitude of a force experienced by an object and a direction of the force that the object experiences. In some implementations, a set of force vectors may be used to determine a set of torque vectors corresponding to the plurality of trajectories, or the set of torque vectors may be determined/measured separately. A torque vector may be determined by computing a cross product of a displacement vector (i.e., a vector from the point from which the torque experienced by the object is measured to the point where force is applied to the object) and a force vector. A magnitude of a given torque that an object experiences may be measured by the same sensor that measures forces or by a different sensor.

At block 306, the method 300 includes determining a virtual model of the set of force vectors, where boundaries of the virtual model are representative of constraints on magnitudes of forces that are applied in a given direction to perform the plurality of trajectories. The virtual model may be an n-dimensional model with n-dimensional vector space.

At block 308, the method 300 includes determining one or more subsequent trajectories corresponding to a subsequent set of force vectors that are within the boundaries of the virtual model, where the determined one or more subsequent trajectories represent trajectories that enable the robotic manipulator to move a subsequent physical object at particular accelerations along the subsequent trajectories without dropping the subsequent physical object.

In some implementations, these and other operations of the method 300 may be performed with respect to multiple physical objects, each object having been moved individually by the robotic manipulator, or may be performed with respect to multiple physical objects moved simultaneously by the robotic manipulator (e.g., a gripper carrying and moving two physical objects, either the same or different objects). As such, the term "physical object" may refer to a combination of physical objects moved simultaneously, and the term "center of mass" may refer to a center of mass of that combination, etc.

While movements of physical objects that did not result in the physical objects being dropped may be referred to as "successful" trajectories, movements, force vectors, etc. and while movements of physical objects that resulted in the physical objects being dropped may be referred to herein as "failed" trajectories, movements, force vectors, etc., other situational contexts may be taken into account to determine whether movement of a physical object was successful or a failure. For instance, in some implementations, a "successful" trajectory, movement, force vector, etc. can refer to a trajectory along which a robotic manipulator moved a physical object without a threshold loss of contact between the gripper and that physical object. Other determinants of success and failure are possible as well.

In some implementations, operations associated with the method 300 may involve two processes: data collection and modelling. Each process may be accomplished in various ways.

Data collection processes may involve measurement of a set of admissible forces and torques experienced at the force-torque sensor. In practice, actual limits on forces and torques of the gripper are determined with respect to the junction between the gripper and the payload (or, when there are multiple grippers, with respect to a uniform area rather than a single point). However, for implementations that do not or cannot include a force-torque sensor at the junction (also referred to as an "attachment point" or "attachment surface" herein), force and torque data measured at a force-torque sensor offset from the junction may serve as a proxy. Such a force-torque sensor may be mounted at a "wrist" of the robotic manipulator near the gripper (see FIG. 4).

The data collection may be static or dynamic. Static data collection, for instance, may involve the robotic manipulator gripping a payload and slowly rotating the payload around a particular axis until the gripper drops the payload. Meanwhile, the force-torque sensor may measure sets of forces and torques from a period of time between when the robotic manipulator grips the payload and when the gripper drops the payload or otherwise loses at least a portion of contact with the payload. The measured sets of forces and torques may then be classified as admissible and thus added to a set of admissible forces and torques. This process may be repeated to collect a wide variety of data. For instance, payloads of different masses and lengths may each be rotated around different axes while the force-torque sensor measures sets of forces and torques until respective payloads are dropped.

Dynamic data collection, on the other hand, may involve capturing the effects of linear acceleration, angular velocity, and angular acceleration on the force and torque limits of the gripper. An example dynamic data collection processes may thus involve the gripper gripping a payload and moving it through a wide variety of trajectories that induce different amounts of forces and torques at the junction between the gripper and the payload, which are measured by the force-torque sensor. The measured sets of forces and torques for successful trajectories may then be classified as admissible and thus added to a set of admissible forces and torques.

For both static and dynamic data collection, measured sets of forces and torques that are classified as inadmissible can be collected as well. For example, for static data collection, the last few force-torque sensor measurements that were determined before the gripper dropped the payload may be classified as inadmissible and thus added to a set of inadmissible forces and torques. Similarly, for dynamic data collection, the measured sets of forces and torques for failed trajectories may be classified as inadmissible and thus added to a set of inadmissible forces and torques.

Furthermore, in some implementations, both static and dynamic data collection processes may be used in conjunction to produce a single dataset that includes admissible (and inadmissible, in some scenarios) sets of forces and torques, thus covering both static and dynamic cases.

Within examples, the received (i.e., collected) data may include multiple trajectories associated with one physical object (i.e., payload), such as a box. While the box is attached to the gripper of the robotic manipulator, a control system of the robotic manipulator may instruct the robotic manipulator to move the box in various directions, along the multiple trajectories, at varying accelerations, and then store in memory various information associated with each movement. For instance, the information associated with each movement may include the mass of the box, center of mass of the box, one or more trajectories along which the box was moved, one or more accelerations at which the box was moved along each of the one or more trajectories, an identifier of a type of gripper that gripped the box, and an indicator of whether the gripper dropped the box as a result of the torque experienced by the box. In related examples, the information may also include an indicator of whether the box experienced a loss in contact with the gripper for at least a given period of time (e.g., slipped) or a metric indicating a measured degree at which the box experienced the loss in contact with the gripper, such as the given period of time during which the box experienced the loss in contact or a percentage of surface area of the box that lost contact with the gripper, based on a size or other parameters of the gripper.

Based on information such as the trajectories, mass, and accelerations, a computing device may determine the set of force vectors corresponding to the plurality of trajectories. For instance, for a given physical object, the computing device may determine all the forces (and torques, in some examples) experienced by the given physical object that resulted in the given physical object not being dropped or otherwise mishandled by the gripper, based on at least the mass of the given physical object and the one or more accelerations at which the robotic manipulator moved the given physical object. The computing device may determine such forces for other physical objects as well, thereby accumulating a database of force vectors associated with physical objects of various masses and centers of mass.

In some implementations, the computing device may determine the forces and torques experienced by the given physical object at various points in time while the physical object is moved along the trajectory based on data received from one or more force-torque sensors coupled to the gripper (or from one or more force-torque sensors per gripper, where there is more than one gripper). The force-torque sensor may be located at the "gripping location" of the gripper (i.e., the surface where the gripper contacts the physical object) or may be located offset from the gripping location. In other implementations, other sensors may be used to determine other parameters associated with the physical object's experience during movement and/or other information associated with the trajectories.

Within examples, the computing device may first receive data representative of a plurality of trajectories along which the robotic manipulator, while gripping the one or more physical objects using the gripper, previously moved the one or more physical objects, regardless of whether the one or more physical objects were dropped. Within such examples, the computing device may remove, from the received data, one or more trajectories (and information/metadata associated therewith, including force vectors) along which the robotic manipulator, while gripping a particular one or more physical objects using the gripper, previously moved that particular one or more physical objects and dropped the one or more physical objects. By way of example, the computing device may receive one or more trajectories at a time, and upon receiving those one or more trajectories, the computing device may add those trajectories to a set of successful trajectories if the physical object was not dropped. On the other hand, if the physical object was dropped while moving the physical object along one or more trajectories, those trajectories may be added to a different set of trajectories and/or may be deleted entirely. As another example, the computing device may determine one or more force vectors associated with one or more successful trajectories as the computing device receives data representative of those one or more trajectories. The computing device may thus remove failed force vectors as the failed force vectors are received and/or store data associated with the failed force vectors in memory. Other examples are also possible.

Within examples, as a physical object is moved along a given trajectory, the computing device may determine and store in memory one or more forces and/or torques experienced by the physical object at various points in time along the trajectory. For instance, during a first phase of a given successful trajectory, the robotic manipulator may move a box at a consistent first acceleration. As such, based on a mass of the box and the first acceleration, the computing device may determine, based on data received from a force-torque sensor of the gripper during the first phase, a force vector associated with the first phase of the given successful trajectory. Further, during a second phase of the given successful trajectory, the robotic manipulator may move a box at a consistent second acceleration different from the first acceleration. As such, based on the mass of the box and the second acceleration, the computing device may determine, based on data received from the force-torque sensor of the gripper during the second phase, a force vector associated with the second phase of the given successful trajectory. Other examples are possible as well.

In some implementations, the data received by the computing device may include respective confidence scores corresponding to one or more of the trajectories (including successful and/or failed trajectories) and/or corresponding to one or more force vectors of the set of force vectors. For example, if a box was moved along a given trajectory ten times, at the same acceleration each time, and the box was dropped only once out of the ten times that it was moved along the given trajectory, the computing device may receive or determine a confidence score (e.g., 90% confidence, in this example) or other confidence metric associated with the given trajectory and/or associated with one or more force vectors of the given trajectory (e.g., whether a given force vectors is more or less likely to cause the box to be dropped).

Figure 4:
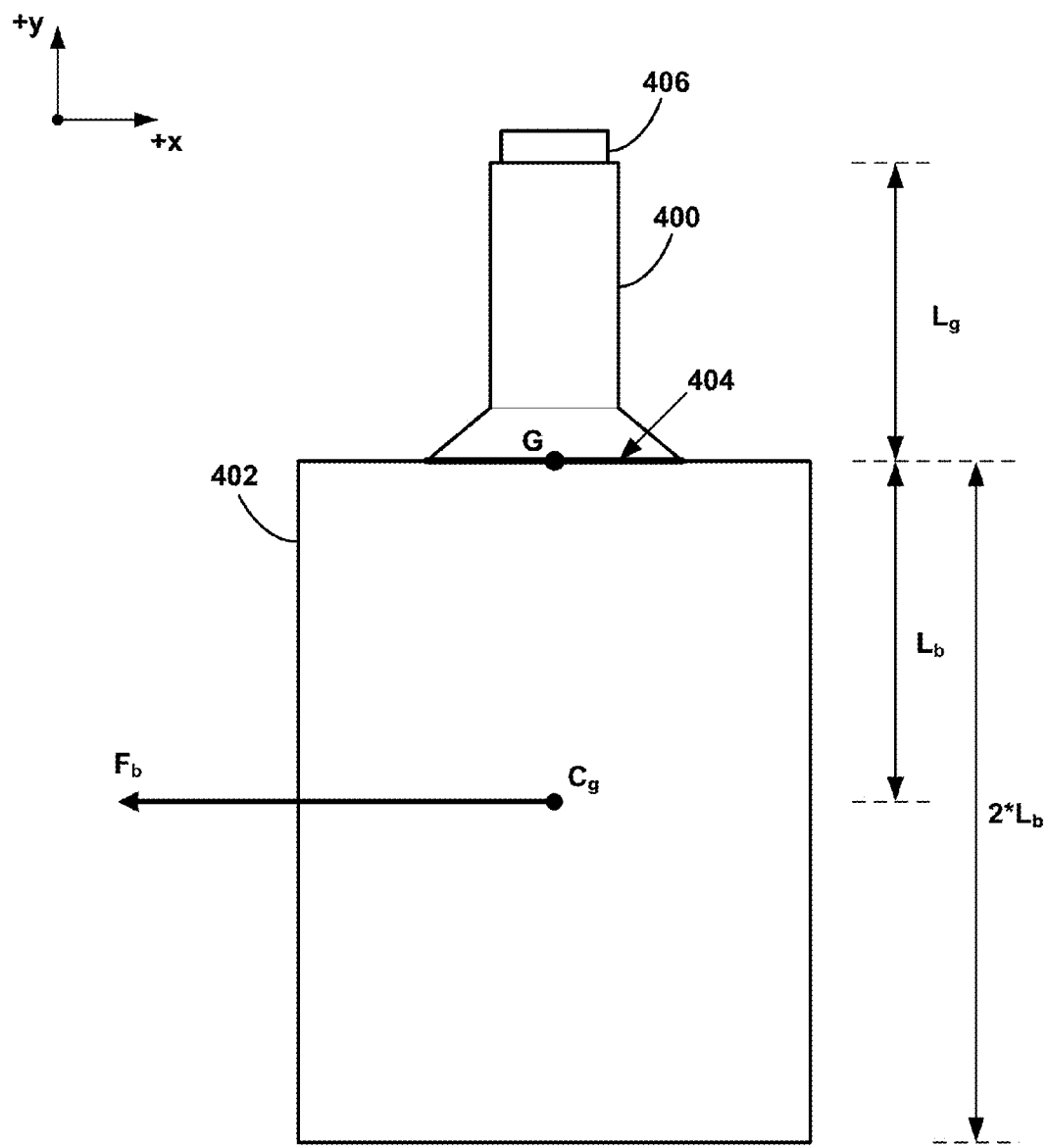
FIG. 4 illustrates an example system for facilitating performance of the example method, in accordance with at least some implementations described herein.

FIG. 4 illustrates an example system for facilitating performance of the example method, in accordance with at least some implementations described herein. In particular, FIG. 4 illustrates a combination of a static data collection system and a modelling method that may estimate a location of a gripper with respect to a force-torque sensor and may estimate the force and torque limits on the gripper per axis.

As shown, the system includes a gripper 400 of length Lg that is attached to a box 402 of length 2*Lb and center of mass Cg. As shown, the gripper contacts the box at an attachment surface 404, at which the gripper may have a static torque limit. Further, the system includes a force-torque sensor 406 mounted at a "wrist" of the robotic manipulator near the gripper 400 and located at a distance of Lg from the attachment surface 404, the force-torque sensor being configured to measure (e.g., estimate or determine) the forces and torques experienced by the box.

Given a force Fb on the box, the torque at the attachment surface 404 (or, more particularly, at attachment point G), Tg, may be represented by Equation 1.

$$Tg = Lb * Fb \qquad \text{Equation (1)}$$

However, because the location of the force-torque sensor 406 is offset from the attachment point G by the length of the gripper 400, Lg, this offset may be taken into account by Equation 2, which represents the measured torque (and force) experienced by the box.

$$Tf = (Lb + Lg) * Fb \qquad \text{Equation (2)}$$

Accordingly, by slowly moving a box of given length (such as box 402 of given length 2*Lb) through different rotation angles, the computing device may use the resulting torques and forces measured by the force-torque sensor 406 to determine a range of values that limit Tf, where Tf may be valid for only a given mass (and Cg) or other given parameter of the box. Further, by determining ranges of values of Tf for given box masses, the offset between the attachment point G and the force-torque sensor 406 may be accounted for.

Equations 3 and 4 may be used to calculate a first torque Tf1 and a second torque Tf2 experienced by a first box of a first mass and a second box of a second mass different from the first mass, respectively, based on a first force Fb1 experienced by the first box and a second force Fb2 experienced by the second box. In some scenarios, Tf1 and Tf2 may represent the maximum torque the box can experience before causing the gripper to drop the box.

$$Tf1 = (Lb+Lg)*Fb1 \quad \text{Equation (3)}$$

$$Tf2 = (Lb+Lg)*Fb2 \quad \text{Equation (4)}$$

Furthermore, in some scenarios, for Equations 3 and 4, it may be assumed that the maximum torque (Tg) may be the same for both Tf1 and Tf2. This scenario may be represented by Equations 5 and 6. Equations 5 and 6 may then be combined to determine an estimated gripper length, Lg, which is represented by Equation 7. An estimated gripper length may represent the distance from the force-torque sensor 406 to the gripper surface. However, in implementations where a gripper comprises multiple suction cups or other gripping devices (or where a gripper comprises one suction/device of a large area), such an estimated gripper length may not be able to be defined as noted above. The operations described with respect to FIG. 4 assumes a gripper model that comprises a single hypothetical attachment point, G, and a hypothetical distance from the force-torque sensor 406 is determined to best fit the collected data.

$$Tg = Tf1 - Lg*Fb1 \quad \text{Equation (5)}$$

$$Tg = Tf2 - Lg*Fb2 \quad \text{Equation (6)}$$

$$Lg = (Tf1 - Tf2)/(Fb1 - Fb2) \quad \text{Equation (7)}$$

The estimated gripper length should be roughly equal to the actual gripper length when all suctions/gripping devices that are used to grasp the box lie on the same plane to grasp a single face of the box, but may be different when multiple suctions/gripping devices are non-planar (i.e., arranged on two planes perpendicular to each other) so that the gripper can hold on to an edge of a box using two of its perpendicular faces. More data points can be incorporated in estimating the above model by jointly estimating Tg and Lg using a linear regression. For non-planar suctions/devices, applying this same model along different axes will provide us with a starting point from where we can iterate. In this case, the "Lg" value is not expected to be physically realistic.

Within examples, the equations and systems described herein, along with other possible techniques, systems, operations, etc., may be used to determine constraints on sustainable forces and torques by a box and gripper so as to facilitate optimization of future trajectories of boxes, such as to determine a shortest path along which to move a box and a fastest trajectory to move the box, among other possibilities.

It should be understood that while the above-noted equations relate to a single gripper gripping a physical object on one surface of the physical object, the equations may be modified in scenarios where multiple grippers grip a physical object on one or more multiple different surfaces of the physical object. Furthermore, other equations and techniques may be implemented as well to determine a range of torques, estimated gripper lengths, etc.

It should also be understood that while the example system is illustrated in two dimensions, it should be understood that the example system may facilitate performance of the example method in three dimensions as well.

Given a set of admissible forces and torques, a computing device can determine a virtual model that predicts success or failure for hypothetical and future forces and torques experienced at the force-torque sensor. In some implementations, the computing device may determine the virtual model with respect to a particular gripper and/or a particular physical object. For example, the computing device may determine one virtual model for a first type of gripper (e.g., a single, suction gripper), whereas the computing device may determine a different virtual model for a second type of gripper different from the first type of gripper (e.g., a magnetic gripper, two combined suction grippers, etc.). As another example, the computing device may determine one virtual model for a box with a first weight and center of mass, whereas the computing device may determine a different virtual model for a box with a second weight and center of mass different from the first weight and center of mass. Other examples are possible as well. Further, the computing device may determine the virtual model with respect to another factor as well, such as a particular acceleration.

Within examples, in line with the discussion above, the computing device may determine the virtual model based in part on an offset between a location of the force-torque sensor and a location (e.g., the gripper/payload junction) at which the gripper contacts the one or more physical objects, such as the offset discussed with respect to FIG. 4.

Types of virtual models that may be determined may include convex hull models and probabilistic classifier models, among other possibilities. Convex hull models may include an n-dimensional convex hull "wrapped" around an admissible set of force vectors, and may also be wrapped around an admissible set of torque vectors as well, where any force/torque vector that lies in the interior of the convex hull may be considered to be admissible for the gripper. For instance, for a 2D convex hull model, boundaries of the model may be lines that contain a convex area. This can also be extended to 3D, where the boundaries of a 3D convex hull are planes that contain a convex volume. Further, in four or more dimensions, the boundary of the corresponding convex hull may be a set of hyperplanes that contain the n-dimensional volume, where n is greater than or equal to four. As an example, for a six-dimensional (6D) vector space, each point may be represented by $(F_x, F_y, F_z, T_x, T_y, T_z)$ for forces and torques along x, y, and z axes, respectively. Each bounding hyperplane of that convex hull may be defined using a 6D point and a normal vector at that 6D point.

In some implementations of 6D convex hull models, a large amount of data may be required to suitably fill the 6D space and generate a convex hull around it of sufficient volume. Accordingly, the 6D vector space may be broken up into sub-spaces of lower dimensionality, (e.g. 3D force sub-space and 3D torque sub-space). A convex hull may then be wrapped around each sub-space, and a force/torque vector would be considered admissible if it lies in the interior of the convex hulls in each sub-space. In alternate implementations, each axis of force and torque may be considered to be an independent sub-space, in which case a convex hull for each axis may extend from a minimum to a maximum value from the admissible set of forces and torques.

Generally, in some implementations, the computing device may determine the virtual model by determining one or more virtual planes for each force vector (e.g., a plane or hyperplane "touching" an endpoint of a force vector in virtual space) and then determining the boundaries of the virtual model to be an integration of all the planes determined for each force vector. Such a virtual model may facilitate a comparison of a new force vector of given magnitude with predetermined force vectors of other magnitudes. Namely, the computing device may determine whether a magnitude or other measurable characteristic of the new force vector is greater than, less than, or equal to one or more of the predetermined force vectors based on whether the new force vector lies within one or more of the planes determined for the predetermined force vectors.

Within examples, based on the one or more planes determined for each force vector of the set, the computing device may construct a virtual model different than a convex hull, such as an isosurface or other full volume that is not a convex hull and contains the set of force vectors.

Sets of admissible forces and torques may also be modeled using probabilistic classification. In some implementations of probabilistic classification, a computing device may fit a probabilistic model to a set of admissible forces and torques that maps force and torque vectors to a likelihood of gripper failure. For instance, a probability function, P(Force, Torque), may have a value between 0 and 1. Such a model can be fit using standard machine learning methods like logistic regression (e.g., for a linear model) or kernel logistic regression (e.g., for a non-linear model). This probabilistic modeling method might be useful when predictions of forces and torques at the sensor are not perfect, which can occur due to compliance in the gripper suction cups or the payload itself.

Figure 5C:
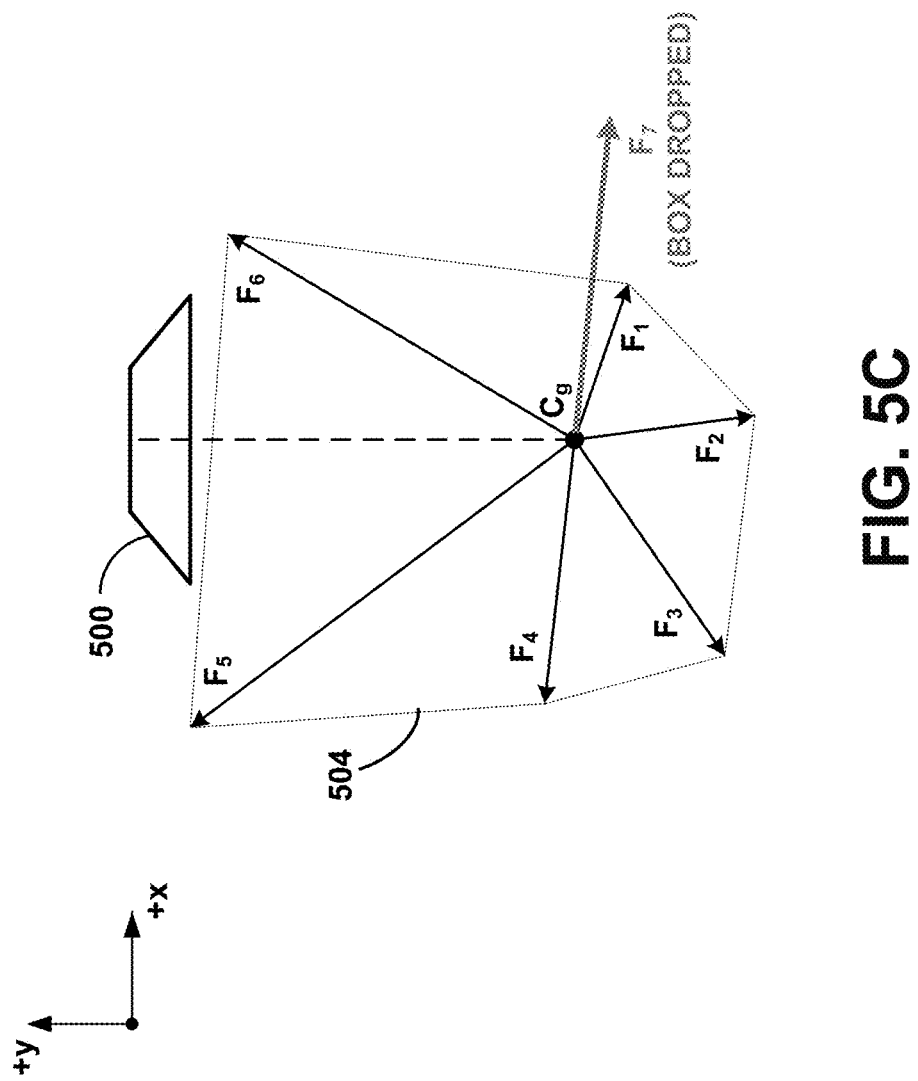

FIGS. 5A-5C illustrate example operations of the example method being performed, in accordance with at least some implementations described herein. In particular, FIGS. 5A-5C illustrate a portion of steps involved in building a model of admissible forces by a given physical object (not shown), such as the box 402, while being moved by a robotic manipulator with a given gripper 500. While these steps are illustrated as including force vectors and virtual models in two dimensions, it should be understood that similar operations may be implemented with respect to force vectors and virtual models in three or more dimensions, as discussed above.

FIG. 5A illustrates a snapshot of a virtual model 502 determined based on five force vectors, F1 through F5, that are associated with successful trajectories As shown, the virtual model 502 may bound the force vectors. The virtual model 502 of FIG. 5A may have been determined beginning with a first test force experienced by the box. As the first test force was experienced by the box, the box may not have fallen off the gripper, and thus the computing device determined force vector F1 as the first force vector of the virtual model. Next, a second test force may have been experienced by the box, the second test force having a different acceleration and direction than the first test force. Again, the second test force may not have caused the box to fall off the gripper, and thus the computing device determined force vector F2 as the second force vector of the virtual model, thereby expanding the boundaries of the virtual model. The same process may have been repeated until five force vectors had been determined by the computing device, each force vector being associated with a respective successful trajectory of the box and each force vector having a respective acceleration and direction.

Next, FIG. 5B illustrates a snapshot of an updated virtual model 504 based on a new successful trajectory with force vector F6. For instance, the computing device may cause the robotic manipulator to grip and move the box such that the box experiences a sixth test force with a particular magnitude and direction. As shown, the sixth test force may not have caused the gripper to drop the box, and thus the computing device may determine force vector F6 based on the new successful trajectory, thereby expanding the boundaries of the virtual model and resulting in the updated virtual model 504.

FIG. 5C illustrates a seventh force vector F7 of a seventh test force, the seventh test force being associated with a failed trajectory. For instance, after determining F6 and updating the virtual model, the computing device may then cause the robotic manipulator to grip and move the box such that the box experiences the seventh test force with a particular magnitude and direction. As shown, the seventh test force may have caused the gripper to drop the box, and thus the computing device may not adjust the virtual model 504 based on the seventh force vector. In some scenarios, the computing device may then determine the virtual model 504 as shown in FIGS. 5B and 5C to be a final version of the virtual model associated with that box and/or gripper 500. In other scenarios, however, the computing device may continue to test the box with other forces.

In some scenarios, when building/determining the virtual model, the box may experience a force which causes the gripper to drop the box, yet the force vector associated with that force may fall within boundaries of the virtual model, the computing device may take various responsive actions. As an example, the computing device may not include that force vector and continue building/adjusting the virtual model in accordance with the present method. As another example, the computing device may associate a confidence score or probability to that force vector and store in memory an indicator of that confidence score or probability. For instance, although a particular force vector of a given magnitude and direction may be associated with a failed trajectory, subsequent force vectors of the given magnitude and direction (or force vectors within a threshold magnitude and direction from the particular force vector) may be associated with successful trajectories. Phrased another way, the failed force vector may be stored, tagged as a failed force vector, and may later be used to build a probabilistic model. Other examples are possible as well.

Within examples, when the computing device receives an instruction for the robotic manipulator to move the subsequent object along a subsequent trajectory, the computing device may compare the subsequent trajectory (and one or more force vectors thereof) with a predetermined, n-dimensional virtual model (or other type of virtual model) associated with one or more of: that exact subsequent physical object, a physical object with the same center of mass as the subsequent physical object, a gripper used for a predetermined trajectory along which a physical object similar to the subsequent physical object was moved, among other possibilities.

Given the mass of the subsequent physical object and given one or more accelerations at which the computing device may move the subsequent physical object along the subsequent trajectory, the computing device may determine whether one or more of the forces that the subsequent physical object may experience may cause the gripper to drop the subsequent physical object at one or more points along the subsequent trajectory.

Within examples, the computing device may perform one or more operations of the present method in response to determining that a location of a center of mass of the subsequent physical object with respect to the gripper substantially matches a location of a center of mass of one or more previously-moved physical objects with respect to the gripper. Such a determination may cause the computing device to select a virtual model associated with a location of a center of mass of a previously-moved physical object for determining whether force vectors experienced by the subsequent physical object with approximately the same location of the center of mass may be within boundaries of that virtual model. Other parameters of previously-moved physical objects and/or parameters the robotic manipulator/gripper may be compared with parameters of subsequent physical objects to facilitate selection of an appropriate virtual model as well.

In some implementations, the computing device may alter the subsequent trajectory based on whether members of the subsequent set of force vectors are within the boundaries of the virtual model. For example, the computing device may receive an instruction for the robotic manipulator to move the subsequent physical object at one or more candidate trajectories corresponding to a candidate set of force vectors, the candidate set of force vectors representing forces to be exerted on the subsequent physical object at a plurality of points in time as the subsequent physical object is moved along the one or more candidate trajectories. In response to receiving the instruction, the computing device may determine whether members of the candidate set of force vectors are within the boundaries of the virtual model. The computing device may then, in turn, adjust members of the candidate set of force vectors that are outside of the boundaries of the virtual model, thereby updating the candidate set of force vectors. For instance, the computing device may adjust, for at least one force at one or more points in time along the subsequent trajectory, an acceleration and/or direction of the movement of the at least one force exerted on the subsequent physical object. As such, the adjusted/updated candidate set of force vectors may be used to determine/adjust the one or more subsequent trajectories.

Figure 6A:
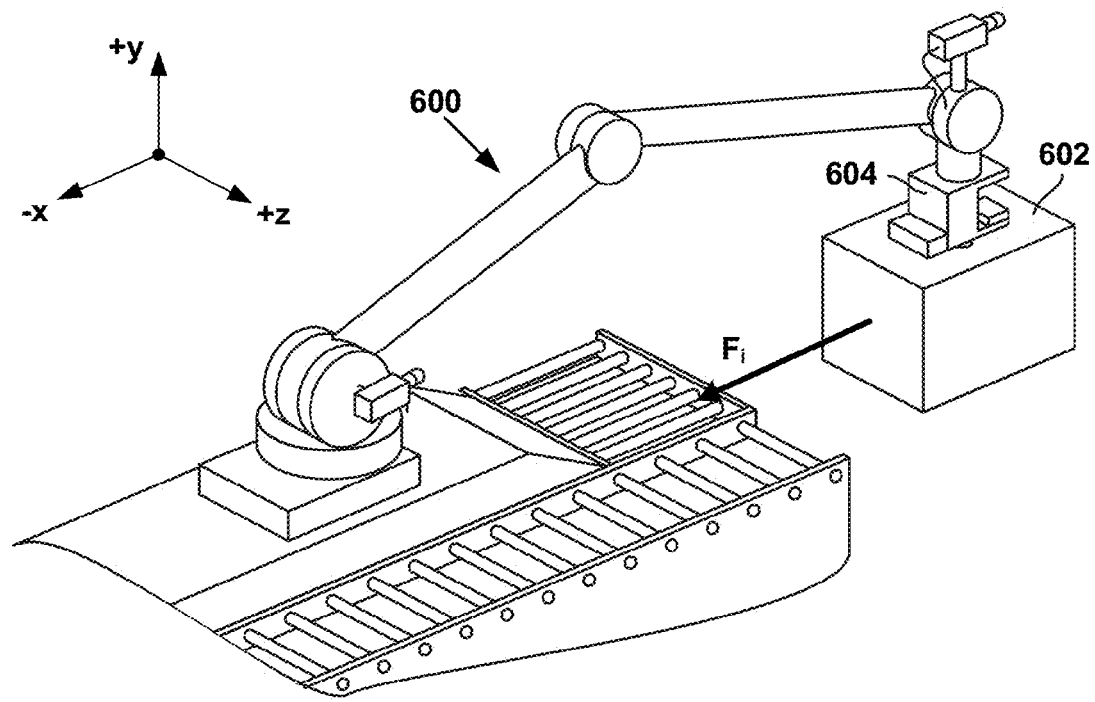
FIGS. 6A and 6B illustrate example operations of the example method being performed, in accordance with at least some implementations described herein.
Figure 6A:
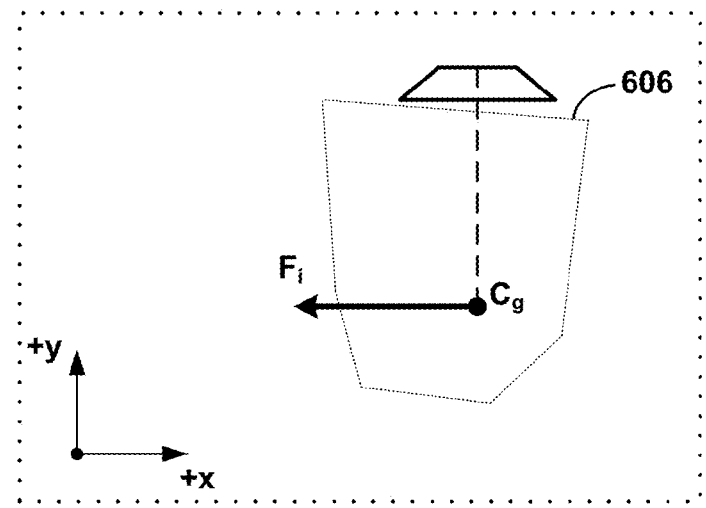
Figure 6B:
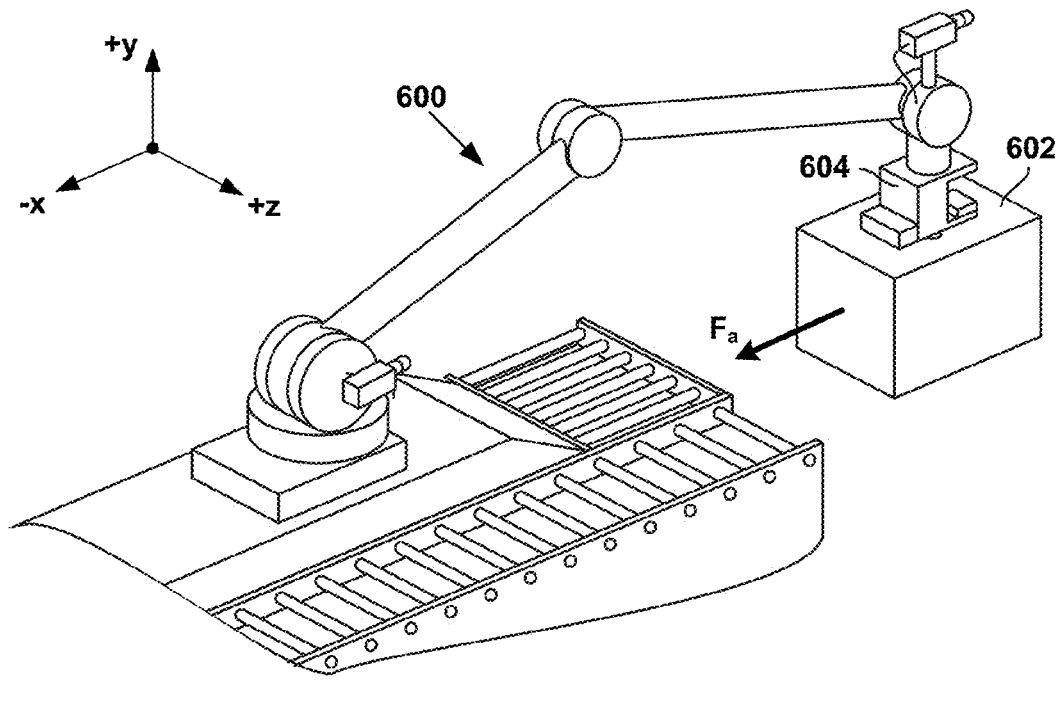
Figure 6B:
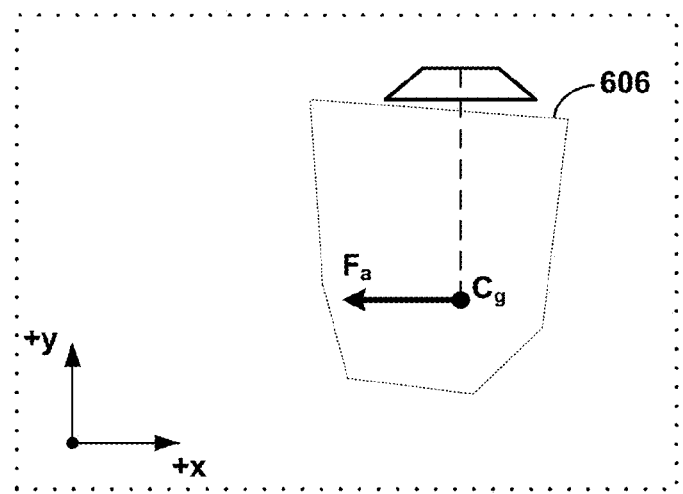

FIGS. 6A and 6B illustrate example operations of the example method being performed, in accordance with at least some implementations described herein. As shown in FIG. 6A, a computing device may receive an instruction for a robotic manipulator 600 to move a box 602, while the box is coupled to a gripper 604 of the robotic manipulator, along a trajectory. In response to receiving the instruction, the computing device may select a particular virtual model 606 associated with the box 602 or a previously-moved box with one or more characteristics that match those of the box 602 to a particular degree.

Based on an acceleration specified by the instruction, a mass of the box 602, a center of mass of the box, and/or based on other factors such as a direction of movement specified by the instruction, the computing device may determine that the trajectory may involve a single force $F_i$ in the −x direction. However, by comparing a force vector for $F_i$ with the virtual model, the computing device may determine that the force vector of $F_i$ exceeds the boundaries of the virtual model 606. In response to the computing device making this determination, the computing device may adjust $F_i$ (e.g., adjust an acceleration used to move the box 602 along the trajectory) such that the box can be moved along the trajectory without being dropped by the gripper 604. For example, as shown in FIG. 6B, the computing device may determine an adjusted force $F_a$ of which the corresponding force vector will not exceed the boundaries of the virtual model 606.

In some implementations, past failed trajectories may be used to indicate one or more regions of a virtual model associated with force vectors that may cause a gripper to drop a physical object. In such implementations, the computing device may store in memory data associated with failed trajectories even when force vectors associated with the failed trajectories are not used to determine a virtual model. For instance, when a threshold high amount of failures occurred in a particular region, the computing device may determine that particular region to be a lower confidence region.

Within examples, the computing device may receive data representative of a plurality of trajectories along which the robotic manipulator, while gripping the one or more physical objects using the gripper, previously moved the one or more physical objects and dropped the one or more physical objects. The computing device may then compare those trajectories where the robotic manipulator previously dropped the one or more physical objects while moving the one or more physical objects with a plurality of trajectories where the robotic manipulator previously moved the one or more physical objects without dropping the one or more physical objects. For instance, the computing device may determine a ratio of successful trajectories to failed trajectories, a ratio of failed trajectories to total trajectories (both successes and failures), and/or a ratio of successful trajectories to total trajectories, among other possibilities.

Based on an output of the comparison, the computing device may determine a plurality of regions of the virtual model. The computing device may also determine respective confidence scores for the plurality of regions or other such metric. For instance, the confidence scores may be representative of the ratio of successful trajectories to failed trajectories.

Within these examples, the computing device may compare a number of failed trajectories of a particular region to a predetermined threshold. As such, if the computing device determines that the number of failed trajectories in the particular region exceeds the predetermined threshold, the computing device may determine a lower confidence score for that particular region. Within other examples, the computing device may determine a confidence score for that particular region based on a difference between the number of failed trajectories in that particular region and the predetermined threshold. Other examples are possible as well.

Within these examples, the computing device may use the determined confidence scores, in accordance with the plurality of regions, to determine the one or more subsequent trajectories corresponding to the subsequent set of force vectors that are within boundaries of one or more of the determined regions of the virtual model. For instance, if one or more force vectors of the one or more subsequent trajectories are within a lower confidence region, the computing device may adjust the one or more subsequent trajectories such that the one or more force vectors are not within the lower confidence region. The computing device may make a decision of whether to adjust such one or more subsequent trajectories based on the confidence score of that particular region. For instance, if the particular region has a lower confidence score that is not threshold low, the computing device may not adjust the one or more subsequent trajectories.

Figure 7:
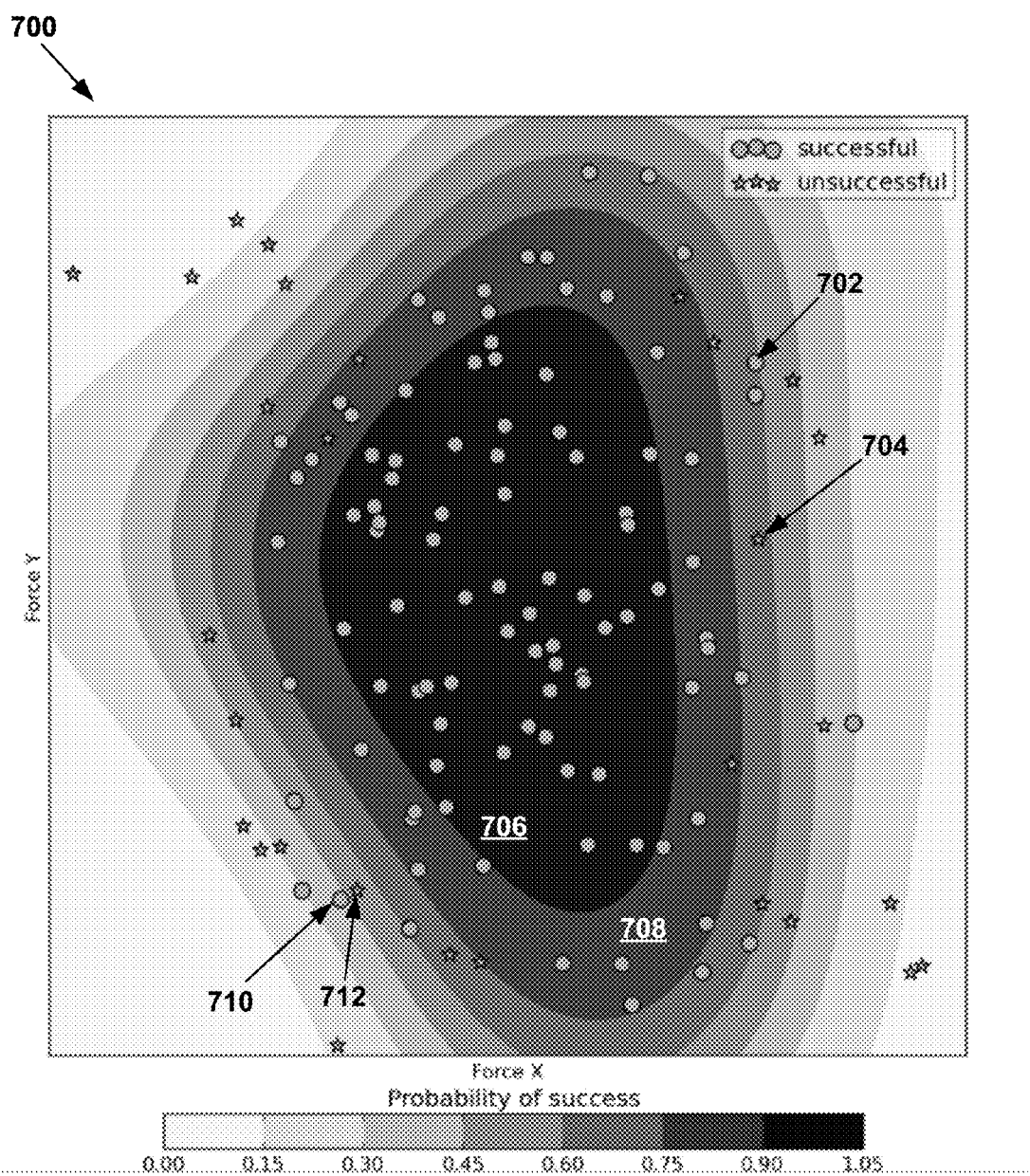
FIG. 7 illustrates example operations of the example method being performed, in accordance with at least some implementations described herein.

FIG. 7 illustrates example operations of the example method being performed, in accordance with at least some implementations described herein. In particular, FIG. 7 illustrates an example probability contour plot 700 of a set of force vectors (X,Y), including points representative of successful measurements, such as point 702 (i.e., circles, as shown on the plot), and points representative of unsuccessful measurements, such as point 704 (i.e., stars, as shown on the plot). The data shown in the plot 700 may be fitted using a support vector machine, and the support vector machine may also generate a probability of success or failure for each point, as shown, where the resulting probability distribution may appear as a contour plot. In practice, one or more confidence level regions may be determined for a virtual model, where points that lie within the one or more confidence level regions may be considered admissible. For instance, regions 706 and 708 in the plot 700 that have probabilities of success of 0.75 or higher may be selected as confidence level regions, and thus all points that lie within those two regions may be considered admissible. Other examples of probability modelling are possible as well.

Moreover, it should be understood that a probability contour plot 700 or other probability model may not always provide an optimal and precise model of gripper/trajectory success.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
   a robotic manipulator;
   a gripper coupled to the robotic manipulator;
   at least one processor; and
   data storage comprising instructions executable by the at least one processor to cause the system to perform operations comprising:
     receiving data representative of a plurality of trajectories along which the robotic manipulator, while gripping one or more physical objects using the gripper, previously moved the one or more physical objects without dropping the one or more physical objects,
     determining a set of force vectors corresponding to the plurality of trajectories,
     determining a virtual model of the set of force vectors, wherein boundaries of the virtual model are representative of constraints on magnitudes of forces that are applied in a given direction to perform the plurality of trajectories, and
     determining one or more subsequent trajectories corresponding to a subsequent set of force vectors that are within the boundaries of the virtual model, wherein the determined one or more subsequent trajectories represent trajectories that enable the robotic manipulator to move a subsequent physical object at particular accelerations along the subsequent trajectories without dropping the subsequent physical object.

2. The system of claim 1, wherein the virtual model of the set of force vectors comprises an n-dimensional shape containing the set of force vectors, wherein n is greater than or equal to 2.

3. The system of claim 1, wherein the virtual model of the set of force vectors comprises an n-dimensional convex hull of the set of force vectors, wherein n is greater than or equal to 2.

4. The system of claim 1, wherein receiving data representative of the plurality of trajectories along which the robotic manipulator, while gripping the one or more physical objects using the gripper, previously moved the one or more physical objects without dropping the one or more physical objects comprises:
   receiving data representative of a plurality of trajectories along which the robotic manipulator, while gripping the one or more physical objects using the gripper, previously moved the one or more physical objects, and
   removing, from the data representative of the plurality of trajectories along which the robotic manipulator, while gripping the one or more physical objects using the gripper, previously moved the one or more physical objects, data representative of a set of trajectories along which the robotic manipulator, while gripping the one or more physical objects using the gripper, previously moved the one or more physical objects and dropped the one or more physical objects.

5. The system of claim 1, the operations further comprising:
   receiving additional data, the additional data being representative of a plurality of trajectories along which the robotic manipulator, while gripping the one or more physical objects using the gripper, previously moved the one or more physical objects and dropped the one or more physical objects;
   making a comparison between the plurality of trajectories where the robotic manipulator previously dropped the one or more physical objects while moving the one or more physical objects and the plurality of trajectories where the robotic manipulator previously moved the one or more physical objects without dropping the one or more physical objects; and
   based on an output of the comparison,
     determining a plurality of regions within the virtual model, and
     determining respective confidence scores for the plurality of regions, wherein the respective confidence scores are representative of a ratio of a number of trajectories where the robotic manipulator previously dropped the one or more physical objects while moving the one or more physical objects in the plurality of regions to a number of trajectories where the robotic manipulator previously moved the one or more physical objects in the plurality of regions without dropping the one or more physical objects,
   wherein determining the one or more subsequent trajectories corresponding to the subsequent set of force vectors that are within the boundaries of the virtual model comprises determining, based on the respective confidence scores, the one or more subsequent trajectories corresponding to the subsequent set of force vectors that are within boundaries of one or more of the determined regions of the virtual model.

6. The system of claim 1, wherein determining the one or more subsequent trajectories comprises:
   receiving an instruction for the robotic manipulator to move the subsequent physical object along one or more candidate trajectories corresponding to a candidate set of force vectors, wherein the candidate set of force vectors represent forces to be exerted on the subsequent physical object at a plurality of points in time as the subsequent physical object is moved along the one or more candidate trajectories,
   in response to receiving the instruction, making a determination of whether members of the candidate set of force vectors are within the boundaries of the virtual model,
   based on the determination, making an adjustment to members of the candidate set of force vectors that are outside of the boundaries of the virtual model,
   based on the adjustment, determining an updated candidate set of force vectors, and determining one or more trajectories that correspond to the updated candidate set of force vectors to be the one or more subsequent trajectories.

7. The system of claim 1, further comprising a force-torque sensor, wherein the set of force vectors are determined by the force-torque sensor.

8. The system of claim 7, wherein determining the set of force vectors and determining the virtual model are based in part on an offset between a location of the force-torque sensor and a location at which the gripper contacts the one or more physical objects.

9. A method comprising:
controlling, by one or more processors, a robotic manipulator to, while gripping one or more physical objects using a gripper, move one or more physical objects along a plurality of trajectories;
receiving, by the one or more processors, data representative of a set of the plurality of trajectories, the set of trajectories including trajectories along which the robotic manipulator, while gripping the one or more physical objects using the gripper, moved the one or more physical objects without dropping the one or more physical objects;
determining, by the one or more processors, a set of force vectors corresponding to the set of trajectories;
determining, by the one or more processors, a virtual model of the set of force vectors, wherein boundaries of the virtual model are representative of constraints on magnitudes of forces that are applied in a given direction to perform the set of trajectories;
determining, by the one or more processors, one or more subsequent trajectories corresponding to a subsequent set of force vectors that are within the boundaries of the virtual model, wherein the determined one or more subsequent trajectories represent trajectories that enable the robotic manipulator to move a subsequent physical object at particular accelerations along the subsequent trajectories without dropping the subsequent physical object; and
controlling, by the one or more processors, the robotic manipulator to move the subsequent physical object along the determined one or more subsequent trajectories.

10. The method of claim 9, wherein the virtual model of the set of force vectors is an isosurface containing the set of force vectors.

11. The method of claim 9, wherein the set of force vectors are determined based on masses of the one or more physical objects and based on respective accelerations corresponding to the set of trajectories.

12. The method of claim 9, wherein receiving data representative of the set of trajectories along which the robotic manipulator, while gripping the one or more physical objects using the gripper, moved the one or more physical objects without dropping the one or more physical objects comprises:
receiving data representative of the plurality of trajectories along which the robotic manipulator, while gripping the one or more physical objects using the gripper, previously moved the one or more physical objects, and
removing, from the data representative of the plurality of trajectories along which the robotic manipulator, while gripping the one or more physical objects using the gripper, previously moved the one or more physical objects, data representative of a second set of the plurality of trajectories along which the robotic manipulator, while gripping the one or more physical objects using the gripper, previously moved the one or more physical objects and dropped the one or more physical objects.

13. The method of claim 9, further comprising:
receiving additional data, the additional data being representative of a second set of the plurality of trajectories along which the robotic manipulator, while gripping the one or more physical objects using the gripper, previously moved the one or more physical objects and dropped the one or more physical objects;
making a comparison between the second set of trajectories where the robotic manipulator previously dropped the one or more physical objects while moving the one or more physical objects and the set of trajectories where the robotic manipulator previously moved the one or more physical objects without dropping the one or more physical objects; and
based on an output of the comparison, determining a plurality of regions within the virtual model,
wherein determining the one or more subsequent trajectories corresponding to the subsequent set of force vectors that are within the boundaries of the virtual model comprises determining the one or more subsequent trajectories corresponding to the subsequent set of force vectors that are within boundaries of one or more of the determined regions of the virtual model.

14. The method of claim 13, further comprising:
based on an output of the comparison, determining respective confidence scores for the plurality of regions, wherein the respective confidence scores are representative of a ratio of a number of trajectories where the robotic manipulator previously dropped the one or more physical objects while moving the one or more physical objects in the plurality of regions to a number of trajectories where the robotic manipulator previously moved the one or more physical objects in the plurality of regions without dropping the one or more physical objects,
wherein determining the one or more subsequent trajectories corresponding to the subsequent set of force vectors that are within boundaries of one or more of the determined regions of the virtual model is based on the respective confidence scores.

15. A non-transitory computer readable medium having stored thereon instructions that, upon execution by a computing device, cause the computing device to perform operations comprising:
controlling a robotic manipulator to, while gripping one or more physical objects using a gripper, move one or more physical objects along a plurality of trajectories;
receiving data representative of a set of the plurality of trajectories, the set of trajectories including trajectories along which the robotic manipulator, while gripping the one or more physical objects using the gripper, moved the one or more physical objects without dropping the one or more physical objects;
determining a set of force vectors corresponding to the set of trajectories;
determining a virtual model of the set of force vectors, wherein boundaries of the virtual model are representative of constraints on magnitudes of forces that are applied in a given direction to perform the set of trajectories;
determining one or more subsequent trajectories corresponding to a subsequent set of force vectors that are within the boundaries of the virtual model, wherein the determined one or more subsequent trajectories represent trajectories that enable the robotic manipulator to move a subsequent physical object at particular accelerations along the subsequent trajectories without dropping the subsequent physical object; and controlling the robotic manipulator to move the subsequent physical object along the determined one or more subsequent trajectories.

16. The non-transitory computer readable medium of claim 15, wherein determining the one or more subsequent trajectories corresponding to the subsequent set of force vectors that are within the boundaries of the virtual model is performed in response to determining that a location of a center of mass of the subsequent physical object with respect to the gripper substantially matches a location of a center of mass of the one or more physical objects with respect to the gripper.

17. The non-transitory computer readable medium of claim 15, the operations further comprising:

determining a set of torque vectors corresponding to the set of trajectories, wherein the virtual model includes a virtual model of the set of torque vectors, wherein boundaries of the virtual model are further representative of constraints on magnitudes of torques that are experienced by the one or more physical objects in a given direction to perform the plurality of trajectories.

18. The non-transitory computer readable medium of claim 15, wherein the data further includes respective confidence scores corresponding to at least one force vector of the set of force vectors.

19. The non-transitory computer readable medium of claim 15, wherein the data includes respective accelerations corresponding to the set of trajectories.

20. The non-transitory computer readable medium of claim 19, wherein determining the set of force vectors corresponding to the set of trajectories comprises determining the set of force vectors corresponding to the set of trajectories based at least in part on the respective accelerations corresponding to the set of trajectories.

\* \* \* \* \*